(12) United States Patent
Woo et al.

(10) Patent No.: US 10,587,143 B2
(45) Date of Patent: Mar. 10, 2020

(54) CHARGING APPARATUS CAPABLE OF REDUCING LOW-FREQUENCY LEAKAGE CURRENT

(71) Applicants: HYUNDAI MOTOR COMPANY, Seoul (KR); KIA MOTORS CORPORATION, Seoul (KR)

(72) Inventors: Dong Gyun Woo, Suwon-Si (KR); Hui Sung Jang, Hwaseong-Si (KR); Hyun Wook Seong, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 3 days.

(21) Appl. No.: 16/168,214

(22) Filed: Oct. 23, 2018

(65) Prior Publication Data

US 2019/0379229 A1    Dec. 12, 2019

(30) Foreign Application Priority Data

Jun. 8, 2018 (KR) .................. 10-2018-0065807

(51) Int. Cl.
*H02J 7/02* (2016.01)
*H02M 1/08* (2006.01)
*H02M 1/42* (2007.01)

(52) U.S. Cl.
CPC .............. *H02J 7/022* (2013.01); *H02M 1/08* (2013.01); *H02M 1/4233* (2013.01)

(58) Field of Classification Search
CPC ......... H02J 7/022; H02M 1/08; H02M 1/4233

USPC ........................................................ 320/140
See application file for complete search history.

(56) References Cited

U.S. PATENT DOCUMENTS

| | | | |
|---|---|---|---|
| 10,205,401 B1 * | 2/2019 | Nikitin | H02M 7/53875 |
| 2006/0226707 A1 * | 10/2006 | Mount | H02J 9/062 |
| | | | 307/66 |
| 2007/0127275 A1 * | 6/2007 | Chuang | H02M 3/335 |
| | | | 363/39 |

(Continued)

FOREIGN PATENT DOCUMENTS

| | | |
|---|---|---|
| JP | 2010-119188 A | 5/2010 |
| JP | 2017-69996 A | 4/2017 |

(Continued)

*Primary Examiner* — Stacy Whitmore
(74) *Attorney, Agent, or Firm* — Morgan, Lewis & Bockius LLP (57) ABSTRACT

A charging apparatus capable of reducing low-frequency leakage current includes: a power factor correction converter including a switch, wherein the power factor correction converter converts an AC power inputted by an on/off control of the switch into a DC power by correcting a power factor of the AC power; a DC-DC converter changing a magnitude of voltage outputted from the power factor correction converter into a magnitude of voltage required by an energy storage device to be charged; a first duty controller determining a first duty value of the switch for outputting a voltage having a predetermined magnitude through the power factor correction converter based on a magnitude of a differential mode component of the AC power; and a second duty controller determining a second duty value of the switch for removing a common-mode component of the AC power based on the common-mode component.

19 Claims, 6 Drawing Sheets

(56) References Cited

U.S. PATENT DOCUMENTS

| | | | | |
|---|---|---|---|---|
| 2011/0149606 A1* | 6/2011 | Ho | .......................... | H02J 7/025 |
| | | | | 363/17 |
| 2012/0194141 A1* | 8/2012 | Shi | ....................... | H02M 3/157 |
| | | | | 320/137 |
| 2013/0249469 A1* | 9/2013 | Pahlevaninezhad | .... | H02J 7/022 |
| | | | | 320/107 |
| 2014/0313795 A1* | 10/2014 | Mi | .......................... | H02M 1/44 |
| | | | | 363/44 |
| 2014/0361628 A1* | 12/2014 | Huang | ..................... | H01F 38/14 |
| | | | | 307/104 |
| 2018/0054140 A1* | 2/2018 | Chen | ..................... | H02M 7/797 |
| 2019/0006952 A1* | 1/2019 | Takahara | ............. | H02M 1/4216 |
| 2019/0291585 A1* | 9/2019 | Yang | ....................... | H02P 27/06 |
| 2019/0341847 A1* | 11/2019 | Yuzurihara | ............. | H02M 1/08 |

FOREIGN PATENT DOCUMENTS

| | | |
|---|---|---|
| JP | 2017-163764 A | 9/2017 |
| KR | 10-2014-0114175 A | 9/2014 |
| KR | 10-2016-0013551 A | 2/2016 |

\* cited by examiner

CHARGING APPARATUS CAPABLE OF REDUCING LOW-FREQUENCY LEAKAGE CURRENT

CROSS REFERENCE TO RELATED APPLICATION

The present application claims priority of Korean Patent Application No. 10-2018-0065807 filed on Jun. 8, 2018, the entire contents of which is incorporated herein for all purposes by this reference.

TECHNICAL FIELD

The present disclosure relates to a charging apparatus for charging an energy storage device, and more particularly, to a charging apparatus capable of reducing low-frequency leakage current due to a common-mode component included in AC-grid power.

BACKGROUND

In general, electric vehicles or plug-in hybrid vehicles are equipped with an energy storage device (e.g., a battery) that receives and keeps AC-grid power using a charging facility. Such vehicles are equipped with a charging apparatus that converts AC-grid power provided from an external charging facility into DC power having a desired magnitude in order to charge the energy storage device.

Charging apparatuses that are mounted on vehicles are called On-Board Chargers (OBC) and may include a power factor correction converter that generates DC voltage by correcting the power factor of input AC power and a DC-DC converter that changes the magnitude of output voltage from the power factor correction converter into a magnitude of voltage required for charging a battery. A Y-capacitor is disposed at the input and output terminals of automotive charging apparatuses to remove noise components. In general, the Y-capacitance connected to the output terminal of automotive charging apparatuses is larger in capacitance than the Y-capacitor connected to the input terminal.

The AC power that is provided by charging facilities outside vehicles may be a symmetric type or an asymmetric type, depending on the types of the charging facilities or the types of power supply networks of corresponding countries. When AC power is asymmetric, a common-mode component exists. The common-mode component acts as a low-frequency (grid-power frequency) noise, thereby causing leakage current that leaks to the ground through a Y-capacitor.

In particular, when a DC-DC converter in an automotive charging apparatus is an insulating type including a transformer, the input terminal and the output terminal of the DC-DC converter are isolated to each other, so the common-mode component of grid power does not influence the output terminal of the automotive charging apparatus. However, when the DC-DC converter is a non-insulating type, an electrical connection is formed between the input terminal and the output terminal of the DC-DC converter. Thus, the common-mode component of grid power flows out as low-frequency leakage current through the Y-capacitor connected to the output terminal of the automotive charging apparatus. As described above, since the Y-capacitor connected to the output terminal is very larger in capacitance than the Y-capacitor connected to the input terminal in automotive charging apparatuses, most low-frequency leakage current due to a common-mode concentrates on the Y-capacitor at the output terminal.

An external charging facility includes a Residual Current Detection (RCD) device, but there is a problem that charging is stopped when a low-frequency leakage current over a standard detection level (about 30 mArms) set for RCD is generated.

The description provided above as a related art of the present disclosure is just for helping understanding the background of the present disclosure and should not be construed as being included in the related art known by those skilled in the art.

SUMMARY

An aspect of the present disclosure is to provide a charging apparatus that can reduce low-frequency leakage current due to the common-mode component in a non-symmetric AC power source.

In accordance with an aspect of the present disclosure, there is provided a charging apparatus capable of reducing low-frequency leakage current, the charging apparatus including: a power factor correction converter including a switch and converting and outputting an AC power by an on/off control of the switch into a DC power by correcting a power factor of the AC power; a DC-DC converter changing a magnitude of voltage outputted from the power factor correction converter into a magnitude of voltage required by an energy storage device to be charged; a first duty controller determining a first duty value of the switch for outputting a voltage having a predetermined magnitude through the power factor correction converter based on a magnitude of a differential mode component of the AC power; and a second duty controller determining a second duty value of the switch for removing a common-mode component of the AC power based on the common-mode component, in which the on/off control of the switch is performed based on a final duty value obtained by summing the first duty value and the second duty value.

The charging apparatus may further include first and second Y-capacitors respectively connected to a positive (+) terminal and a negative (−) terminal of an output terminal of the DC-DC converter.

The second duty controller may determine the second duty value on the basis of the relationship between the voltage of the first Y-capacitor or the second Y-capacitor and the voltage of the energy storage device.

The second duty controller may determine the second duty value such that the voltages of the first Y-capacitor and the second Y-capacitor become ½ of the voltage of the energy storage device.

The second duty controller may determine the second duty value to satisfy an equation $v_{Y\text{-}cap\_p} = v_{bat} - \alpha v_{link}$ (where $v_{Y\text{-}cap\_p}$ is the voltage of the first Y-capacitor connected to the positive (+) terminal of the output terminal of the DC-DC converter, $v_{bat}$ is the voltage of the energy storage device connected to the output terminal of the DC-DC converter, $v_{link}$ is DC link voltage of an input terminal of the DC-DC converter, and $\alpha$ is an arbitrary constant that is determined between 0 and 1).

The arbitrary constant a may be a value that is close to 0.5 or 0.5.

The DC-DC converter may be a non-insulating type.

The power factor correction converter may include: a first leg including a first switch and a second switch that are directly connected to each other; and a second leg including a third switch and a fourth switch that are directly connected to each other, and the first leg and the second leg are connected to each other in parallel between two input terminals of an input terminal of the DC-DC converter, a first end of an AC power source providing the AC power is connected to a connection node of the first switch and the second switch, and a second end of the AC power source is connected to a connection node of the third switch and the fourth switch.

The first duty value may include a duty value of the first switch and a duty value of the third switch, the duty value of the first switch and the duty value of the third switch may have a sine waveform increasing/decreasing in increments/decrements of 0.5 as time passes, and the duty value of the first switch and the duty value of the third switch may have a mutual compensation relationship in increments/decrements of 0.5.

In accordance with another aspect of the present disclosure, there is provided a charging apparatus capable of reducing low-frequency leakage current, the charging apparatus including: a power factor correction converter including a switch and converting and outputting an AC power inputted by an on/off control of the switch into a DC power by correcting a power factor of the AC power; a DC-DC converter changing a magnitude of voltage outputted from the power factor correction converter into a magnitude of voltage required by an energy storage device to be charged; first and second Y-capacitors connected respectively between a ground and positive (+) and negative (−) terminals of an output terminal of the DC-DC converter; a first duty controller determining a first duty value of the switch for outputting voltage having a predetermined magnitude through the power factor correction converter based on a magnitude of a differential mode component of the AC power; and a second duty controller determining a second duty value of the switch for making voltage of the first or second Y-capacitor into a DC voltage, in which the on/off control of the switch is performed based on a final duty value obtained by summing the first duty value and the second duty value.

The power factor correction converter may include: a first leg including a first switch and a second switch that are directly connected to each other; and a second leg including a third switch and a fourth switch that are directly connected to each other, and the first leg and the second leg are connected to each other in parallel between two input terminals of an input terminal of the DC-DC converter, a first end of an AC power source providing the AC power is connected to a connection node of the first switch and the second switch, and a second end of the AC power source is connected to a connection node of the third switch and the fourth switch.

The second duty controller may determine the second duty value of the switch so that a common-mode component of the AC power source can be cancelled out by a common-mode component between a connection node of the first switch and the second switch and a connection node of the third switch and the fourth switch.

The second duty controller may determine the second duty value on the basis of the relationship between the voltage of the first Y-capacitor or the second Y-capacitor and the voltage of the energy storage device.

The second duty controller may determine the second duty value such that the voltages of the first Y-capacitor and the second Y-capacitor become ½ of the voltage of the energy storage device.

The second duty controller may determine the second duty value to satisfy an equation $v_{Y\text{-}cap\_p} = v_{bat} - \alpha v_{link}$ (where $v_{Y\text{-}cap\_p}$ is the voltage of the first Y-capacitor connected to the positive (+) terminal of the output terminal of the DC-DC converter, $v_{bat}$ is the voltage of the energy storage device connected to the output terminal of the DC-DC converter, $v_{link}$ is DC link voltage of an input terminal of the DC-DC converter, and $\alpha$ is an arbitrary constant that is determined between 0 and 1).

The arbitrary constant $\alpha$ may be a value that is close to 0.5

The arbitrary constant $\alpha$ may be 0.5

The DC-DC converter may be a non-insulating type converter.

According to the charging apparatus capable of reducing low-frequency leakage current, it is possible to reduce low-frequency leakage current due to the common-mode component of an asymmetric DC power source that is generated in a charging apparatus. Therefore, according to the charging apparatus that can reduce low-frequency leakage current, it is possible to prevent stoppage of charging by reducing leakage current under the detection level (about 30 mArms) of an RCD device in a charging facility.

In particular, according to the charging apparatus that can reduce low-frequency leakage current, it is possible to prevent saturation of a duty value for control and can remove low-frequency leakage current due to the common-mode component within a large voltage range by creating a common-mode removal duty value such that the magnitude of the voltage of a Y-capacitor becomes the difference of values obtained by scaling the voltage of the energy storage device and the link voltage at a predetermined ratio.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, a charging apparatus that can reduce low-frequency leakage current according to various embodiments of the present disclosure is described in detail with reference to the accompanying drawings.

Figure 1:
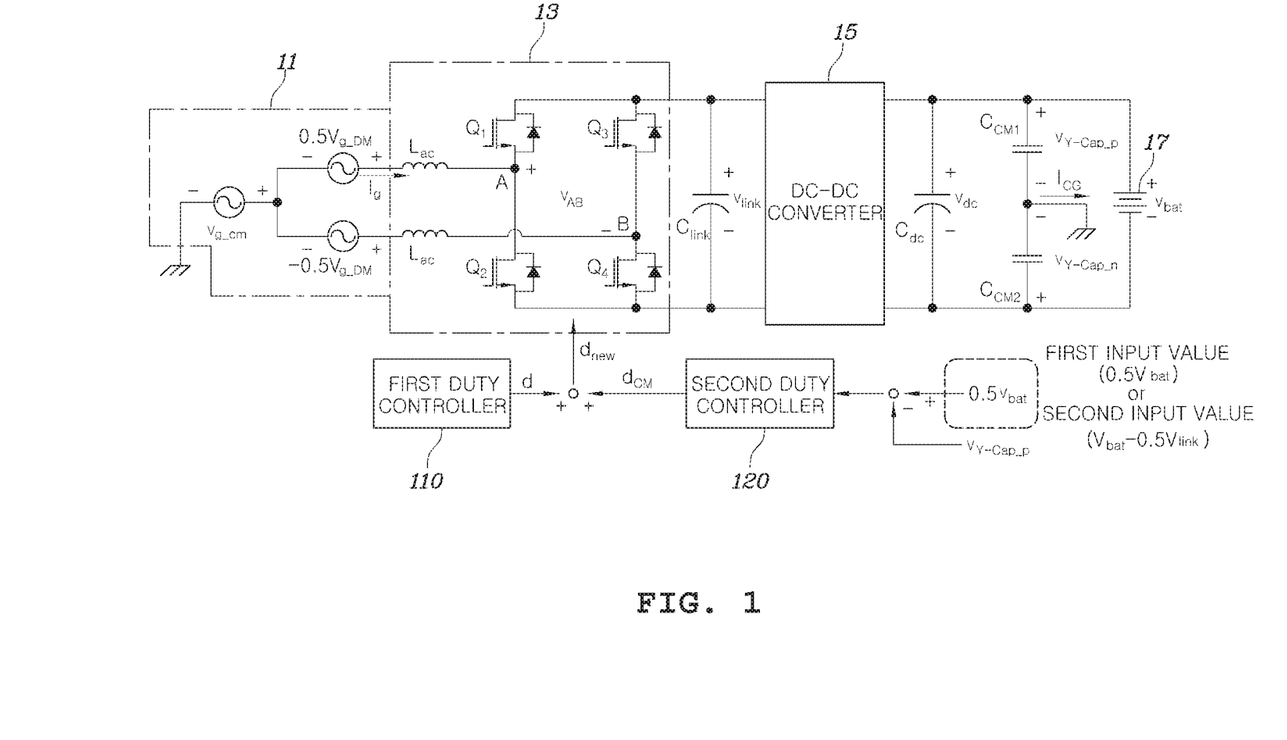
FIG. 1 is a circuit diagram of a charging apparatus that can reduce low-frequency leakage current according to an embodiment of the present disclosure.

FIG. 1 is a circuit diagram of a charging apparatus that can reduce low-frequency leakage current according to an embodiment of the present disclosure.

Referring to FIG. 1, a charging apparatus that can reduce low-frequency leakage current according to an embodiment of the present disclosure may include a Power Factor Correction (PFC) converter 13, a DC-DC converter 15, Y-capacitors $C_{CM1}$ and $C_{CM2}$, and first and second duty controllers 110 and 120.

The PFC converter 13 receives AC power (grid power $v_g$) from an AC power source 11 input from the outside and converts and outputs the AC power into DC power, and corrects the power factor of AC power. In particular, the PFC converter 13 may include a grid-connected inverter topology having a plurality of switching elements Q1-Q4.

In detail, the PFC converter 13 may include a first leg including a first switching element $Q_1$ and a second switching element $Q_2$ that are directly connected to each other and a second leg including a third switching element $Q_3$ and a fourth switching element $Q_4$ that are directly connected to each other. The first leg and the second leg can be connected in parallel to each other between two input terminals of the input terminal of the DC-DC converter 15. That is, the first switching element $Q_1$ and a second switching element $Q_2$ may be sequentially directly connected between the positive (+) terminal and the negative (−) terminal of the output terminal of the PFC converter 13, and the third switching element $Q_3$ and a fourth switching element $Q_4$ may be sequentially directly connected between the positive (+) terminal and the negative (−) terminal of the output terminal of the PFC converter 13.

Further, the PFC converter 13 may include a first inductor $L_{ac1}$ of which both ends are respectively connected to a first end of an input AC power and the connection node of the first switching element $Q_1$ and the second switching element $Q_2$, and a second inductor $L_{ac2}$ of which both ends are respectively connected to a second end of the input AC power and the connection node of the third switching element $Q_3$ and the fourth switching element $Q_4$. The first and second inductors $L_{ac1}$ and $L_{ac2}$ may be used for filtering.

The switching elements Q1-Q4 of the PFC converter 13 can be various transistors including a bipolar junction transistor (BJT), junction gate field-effect transistor (JFET), IGFT such as metal-oxide-semiconductor field-effect transistor (MOSFET), insulated-gate bipolar transistors, etc. and can be controlled to be turned on/off by duty values that are determined by the first duty controller 110 and the second duty controller 120, which are described below.

AC power $v_g$ that is provided from an external charging facility is input to the input terminal of the PFC converter 13. The AC power that is provided to the input terminal of the PFC converter 13 may have a symmetric or asymmetric structure, depending on the countries of the specifications of charging facilities. AC power that is provided in a symmetric structure has a common-mode component, but there is an AC voltage of a common-mode component having a half magnitude of the maximum magnitude (amplitude) $v_g$ of AC voltage in the AC power that is provided in an asymmetric structure. The common-mode component causes low-frequency leakage current having a frequency corresponding to the frequency thereof. When the AC power source 11 shown in FIG. 1 is an AC power source having a symmetric structure, the common-mode component $v_{g\_CM}$ is 0, and when it is an AC power source having an asymmetric structure, common-mode component $v_{g\_CM}$ is ½ of the amplitude $v_g$ of the AC voltage that is provided by the AC power source.

As described above, a terminal (positive (+) terminal) of the AC power source 11 may be connected to the second end of the first inductor $L_{ac1}$ of which the first end is connected to the connection node of the first switching element $Q_1$ and the second switching element $Q_2$ in the PFC converter 13, while the other terminal (negative (−) terminal) of the AC power source 11 may be connected to the second end of the second inductor $L_{ac2}$ of which the first end is connected to the connection node of the third switching element $Q_3$ and the fourth switching element $Q_4$ in the PFC converter 13.

The PFC converter 13 converts and outputs AC power input from the AC power source 11 into DC power and a DC link capacitor $C_{link}$ of which both ends are connected between both terminals of the output terminal of the PFC converter 13 is charged with power output from the PFC converter 13, thereby generating a DC link voltage $v_{link}$ having a predetermined magnitude.

The DC-DC converter 15 can convert and output an output DC voltage $v_{link}$ of the PFC converter 13 into a DC voltage having a desired magnitude. Various embodiments of the present disclosure relate to a charging apparatus that generates DC power for charging an automotive battery 17 etc., so that the DC-DC converter 15 can be controlled to output a voltage having a magnitude enough for charging the battery 17.

Various embodiments of the present disclosure are intended to reduce low-frequency leakage current due to the common-mode component of the AC power source 11 using the Y-capacitors $C_{CM1}$ and $C_{CM2}$ at the output terminal of the charging apparatus, so the DC-DC converter 15 may be a non-insulating type converter that can receive the common-mode component of the AC power source 11 through the output terminal. The non-insulating DC-DC converter that is applied to various embodiments of the present disclosure can have various structures well known in the art and the method of controlling the DC-DC converter is also well known in the art, so the DC-DC converter 15 is not additionally described.

In the first and second Y-capacitors $C_{CM1}$ and $C_{CM2}$, the first ends may be connected respectively to the positive (+) terminal and the negative (−) terminal of the output terminal of the DC-DC converter 15 (i.e., the output terminal of the charging apparatus), and the second end may be commonly connected to the ground (a chassis ground of a vehicle).

For example, for an automotive charging apparatus, the first and second Y-capacitors $C_{CM1}$ and $C_{CM2}$ at the output terminal of the charging apparatus have capacitance very larger than the Y-capacitor (not shown) disposed at the input terminal of the charging apparatus, so most low-frequency leakage current $i_{CG}$ due to a common-mode component flows to the ground through the first and second Y-capacitors $C_{CM1}$ and $C_{CM2}$ at the output terminal. According to various embodiments of the present disclosure, the duties of the switching elements in the PFC converter 13 are appropriately controlled, as will be described below, to reduce the low-frequency leakage current $i_{CG}$ that flows out to the ground through the first and second Y-capacitors $C_{CM1}$ and $C_{CM2}$.

The first duty controller 110 can determine and output a duty value d that can control the switching elements Q1-Q4 in order for the PFC converter 13 outputs a voltage having a predetermined magnitude. That is, the first duty controller 110 can determine the first duty value d of the switching elements $Q_1$-$Q_4$ in the PFC converter 13 so that the DC link voltage $V_{link}$ can be a voltage having a predetermined magnitude.

In detail, the first duty controller 110 can create a reference current value making the DC link voltage $V_{link}$ follow a predetermined voltage by comparing the DC link voltage $V_{link}$ with the predetermined voltage, and can create a dq-axial voltage control value for making an input current follow a reference current value by comparing the input current with a dq conversion value and the reference current value on the basis of the phase information of an input voltage and then can create the first duty value d by performing dq inversion on the dq-axial voltage control value. The method of creating the first duty value d by the first duty controller 110 is well known technique that is applied to a PFC control structure using an inverter type topology, so it is not described in detail herein.

The second duty controller 120 can determine a second duty value $d_{CM}$ of the switching elements $Q_1$-$Q_4$ in the PFC converter 13 to reduce low-frequency leakage current that is generated by a common-mode component. In an embodiment of the present disclosure, the second duty controller 130 can determine the second duty value $d_{CM}$ of the switching elements $Q_1$-$Q_4$ in the PFC converter 13 to reduce low-frequency leakage current that is generated by a common-mode component, on the basis of the relationship between the voltages of the first and second Y-capacitors $C_{CM1}$ and $C_{CM2}$ and the voltage $v_{bat}$ of the battery (energy storage device 17) to be charged.

In an embodiment of the present disclosure, the first duty value d determined by the first duty controller 110 and the second duty value $d_{CM}$ determined by the second duty controller 120 are summed to be a final duty value $d_{new}$ for controlling the switching elements $Q_1$-$Q_4$ of the PFC converter 13. The switching elements $Q_1$-$Q_4$ are controlled to be turned on/off on the basis of the final duty value $d_{new}$.

Figure 2:
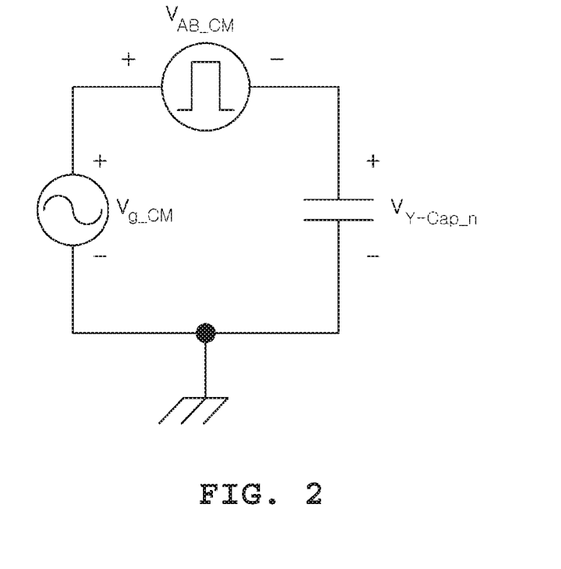
FIG. 2 is an equivalent circuit diagram showing a connection relationship between a common-mode component and a Y-capacitor in a charging apparatus that can reduce low-frequency leakage current according to an embodiment of the present disclosure.

FIG. 2 is an equivalent circuit diagram showing a connection relationship between a common-mode component and a Y-capacitor in a charging apparatus that can reduce low-frequency leakage current according to an embodiment of the present disclosure.

In FIG. 2, the voltage indicated by '$v_{AB\_CM}$' is the common-mode component of the voltage $v_{AB}$ generated between the connection node A of the first switching element $Q_1$ and the second switching element $Q_2$ constituting the first leg of the PFC converter 13 and the connection node B of the third switching element $Q_3$ and the fourth switching element $Q_4$ constituting the second leg.

The equivalent circuit shown in FIG. 2 is an equivalent circuit that is achieved only by the part relating to a low-frequency common-mode component in the circuit shown in FIG. 1. In the circuit of FIG. 1, an inductor Lac is ignorable because impedance for a low-frequency component is low, and the non-insulating DC-DC converter 15 is also ignorable because it transmits a low-frequency common-mode component to the output terminal. Further, the Y-capacitor at the output terminal is easily analyzed on the basis of a DC(−) line in equivalent circuit analysis, so it is appropriate to show a low-frequency common-mode path that goes through the second Y-capacitor $C_{CM2}$. Considering these factors in FIG. 1, the equivalent circuit relating to a low-frequency common-mode component can be derived, as shown in FIG. 2.

As shown in FIG. 2, by controlling the common-mode component $v_{AB\_CM}$ of the voltage between the node A and the node B, it is possible to adjust the leakage current due to the common-mode component $v_{g\_CM}$ of the AC power source flowing to the Y-capacitor (the second Y-capacitor $C_{CM2}$ in FIG. 2). The voltage between the node A and the node B can be determined by controlling the on/off duty values of the switching elements $Q_1$-$Q_4$ by applying a grid-connected inverter topology.

That is, in order to reduce low-frequency leakage current of the Y-capacitors $C_{CM1}$ and $C_{CM2}$ due to the common-mode component of an AC power source, the on/off duty values of the switching elements $Q_1$-$Q_4$ are controlled so that the common-mode component $v_{g\_CM}$ of the AC power source can be cancelled out by the common-mode component $v_{AB\_CM}$ of the voltage between the node A and the node B.

Two examples of controlling on/off duty values of the switching elements $Q_1$-$Q_4$ to reduce low-frequency leakage current of the Y-capacitors $C_{CM1}$ and $C_{CM2}$ due to the common-mode component are described in detail hereafter.

First Control Example

First, as a first control method, which is a method of removing a low-frequency AC component by making the voltages $v_{Y\_Cap\_p}$ and $v_{Y\_Cap\_n}$ of the Y-capacitors $C_{CM1}$ and $C_{CM2}$ into an AC type, it is possible to remove the DC component and the low-frequency AC component of the leakage current $i_{CG}$ that flows out to the ground through the Y-capacitors $C_{CM1}$ and $C_{CM2}$ when controlling the magnitudes of the voltages $v_{Y\_Cap\_p}$ and $v_{Y\_Cap\_n}$ of the Y-capacitors $C_{CM1}$ and $C_{CM2}$ into ½ of the voltage $v_{bat}$ of the energy storage device 17.

To this end, in the first control example, the PFC converter 13 creates a second duty value $d_{CM}$ for making the magnitudes of the voltages $v_{Y\_Cap\_p}$ and $v_{Y\_Cap\_n}$ of the Y-capacitors $C_{CM1}$ and $C_{CM2}$ into ½ of the voltage $v_{bat}$ of the energy storage device 17.

A final duty value $d_{new}$ is obtained by summing the first duty value d output from the first duty controller 110 and the second duty value $d_{CM}$ created by the second duty controller 120 to make the DC link voltage $v_{link}$ into a voltage having a predetermined magnitude, and the switching elements $Q_1$-$Q_4$ in the PFC converter 13 can be controlled to be turned on/off on the basis of the final duty value $d_{new}$.

In this process, even though the second duty value $d_{CM}$ is summed with the first duty value d, the entire duty of the switching elements is correspondingly changed, so differential mode components of the switching elements of the first leg and the switching elements of the second leg that have a mutual compensation relationship can be maintained. Accordingly, even though the second duty value for removing a differential mode component is summed with the first duty value, the performance of entire charging apparatus is not influenced.

Figure 3:
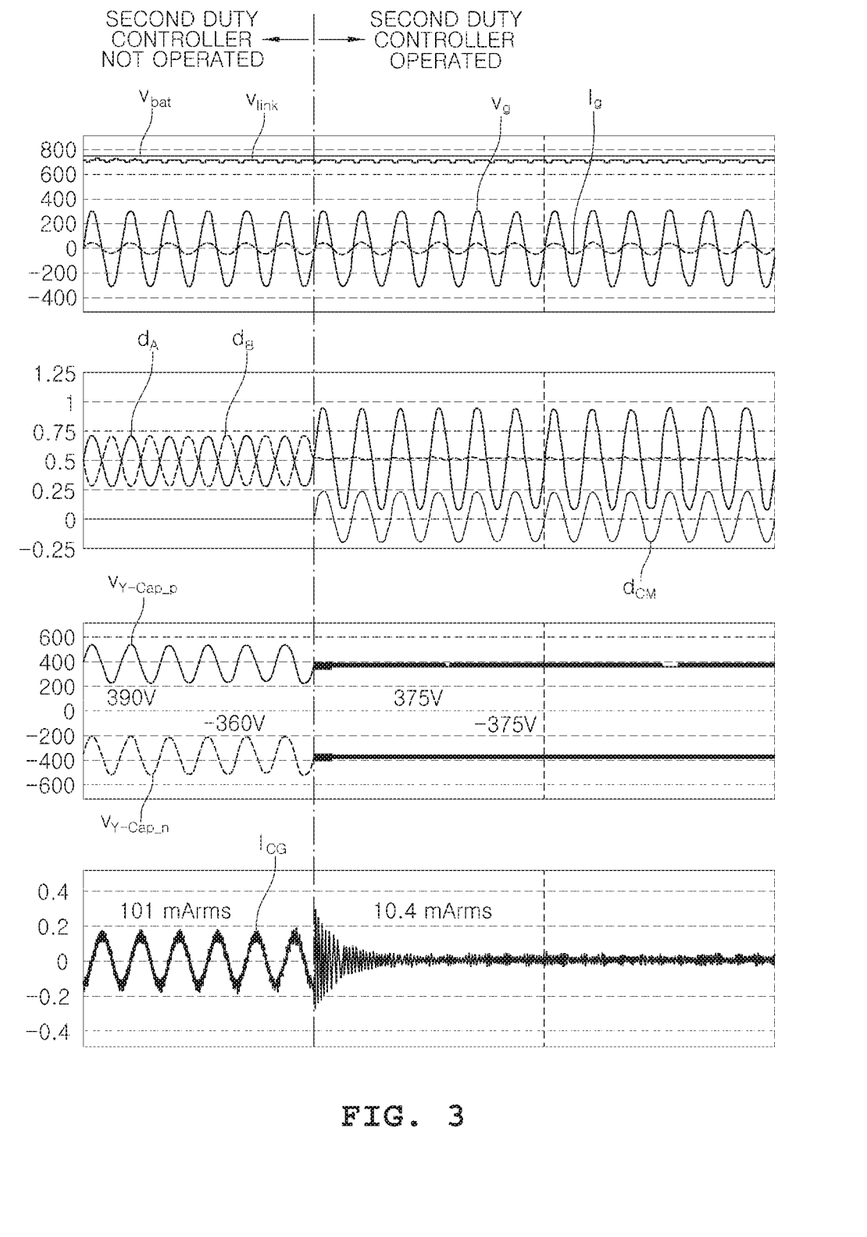
FIG. 3 is a diagram showing various output waveforms by a first control example that controls a PFC converter of a charging apparatus that can reduce low-frequency leakage current according to a first control example of the present disclosure.

FIG. 3 is a diagram showing various output waveforms by a first control example that controls a PFC converter of a charging apparatus that can reduce low-frequency leakage current according to the first control example of the present disclosure.

The uppermost waveform diagram in FIG. 3 shows an input AC voltage $v_g$, an input AC $i_g$, a DC link voltage $v_{link}$ of the output terminal of the PFC converter 13, and the voltage of an energy storage device (i.e., the output voltage $v_{bat}$ of the DC-Dc converter 15 or the charging apparatus) before and after the first control example is performed. It can be seen from the waveform diagram that even though the second duty controller 120 is operated, a second duty value $d_{CM}$ for making the magnitudes of the voltages $v_{Y\_Cap\_p}$ and $v_{Y\_Cap\_n}$ of the Y-capacitors $C_{CM1}$ and $C_{CM2}$ into ½ of the voltage $v_{bat}$ of the energy storage device 17 is summed, and the PFC converter 13 is controlled, the DC link voltage $v_{link}$ and the voltage $v_{bat}$ of the energy storage device are little changed.

The second waveform diagram from the top in FIG. 3 shows duty values, in which $d_A$ that is determined by the first duty controller 110 shows the duty value of the first switching element $Q_1$ of the first leg, $d_B$ that is determined by the first duty controller 110 shows the duty value of the third switching element $Q_3$ of the second leg, and $d_{CM}$ shows a second duty value created by the second duty controller 120. The duty value $d_A$ of the first switching element $Q_1$ and the duty value $d_B$ of the third switching element $Q_3$ have a sine waveform that increases/decreases in increments/decrements of 0.5 as time passes. Further, the duty value $d_A$ of the first switching element $Q_1$ and the duty value $d_B$ of the third switching element $Q_3$ may have a mutual compensation relationship in increments/decrements of 0.5.

As shown in FIG. 3, when the second duty controller 120 creates the second duty value $d_{CM}$ for making the magnitudes of the voltages $v_{Y\_Cap\_p}$ and $v_{Y\_Cap\_n}$ of the Y-capacitors $C_{CM1}$ and $C_{CM2}$ into ½ of the voltage $v_{bat}$ of the energy storage device 17, the second duty value $d_{CM}$ is summed with $d_A$ and $d_B$ that are determined by the first duty controller 110, so $d_A$ and $d_B$ are changed. The changed duty value is the final duty value $d_{new}$.

The third waveform diagram from the top in FIG. 3 shows the voltages $v_{Y\_Cap\_p}$ and $v_{Y\_Cap\_n}$ of the Y-capacitors $C_{CM1}$ and $C_{CM2}$, in which it can be seen that a component having substantially the same frequency as an input AC voltage is included in the voltages $v_{Y\_Cap\_p}$ and $v_{Y\_Cap\_n}$ of the Y-capacitors $C_{CM1}$ and $C_{CM2}$ before the second duty controller 120 is operated, but after the second duty controller 120 is operated, the voltages $v_{Y\_Cap\_p}$ and $v_{Y\_Cap\_n}$ of the Y-capacitors $C_{CM1}$ and $C_{CM2}$ show DC voltages having substantially the same magnitude.

The lowermost waveform diagram in FIG. 3 shows a current $i_{CG}$ that flows out to the ground from the node between two Y-capacitors $C_{CM1}$ and $C_{CM2}$, in which it can be seen that a large-amplitude leakage current having substantially the same frequency as an input AC flows out to the ground before the second duty controller 120 is operated, but after the second duty controller 120 is operated, the current $i_{CG}$ is almost close to 0.

According to the first control example, since a DC offset component for control the magnitudes of the voltages $v_{Y\_Cap\_p}$ and $v_{Y\_Cap\_n}$ of the Y-capacitors $C_{CM1}$ and $C_{CM2}$ into ½ of the voltage $v_{bat}$ of the energy storage device 17 is used to determine a duty value, saturation in which the final duty value exceeds 1 or decreases smaller than 0 due to increase/decrease in voltage of the DC-DC converter 15 disposed behind the PFC converter 13 may occur. This saturation is described in detail with reference to FIGS. 4 to 7.

FIGS. 4 to 7 are diagrams showing various examples of a duty value that is applied for controlling the PFC converter of a charging apparatus that can reduce low-frequency leakage current according to an embodiment of the present disclosure.

Figure 4:
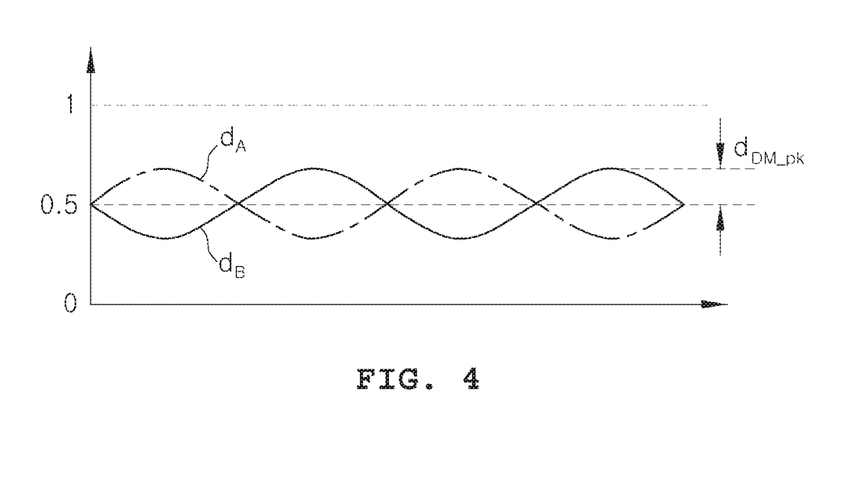
FIGS. 4 to 7 are diagrams showing various examples of a duty value that is applied for controlling the PFC converter of a charging apparatus that can reduce low-frequency leakage current according to an embodiment of the present disclosure.

FIG. 4 shows a waveform of a first duty value d that is output from the first duty controller 110, in which $d_A$ shows the waveform of the duty value of the first switching element $Q_1$ and $d_B$ shows the waveform of the duty of the third switching element $Q_3$. As shown in FIG. 4, the duty value $d_A$ of the first switching element $Q_1$ and the duty value $d_B$ of the third switching element $Q_3$ have a value between 0 and 1 and may have a sine waveform that increases/decreases in increments/decrements of 0.5 as time passes. The duty values $d_A$ and $d_B$ may be set to have a mutual compensation relationship in increments/decrements of 0.5. The peaks $d_{DM\_pk}$ of the duty values $d_A$ and $d_B$ can be determined in accordance with the magnitude of the differential mode component of an input AC voltage.

According to the first control example of the present disclosure, a final duty value $d_{new}$ is created by summing the second duty value $d_{CM}$ for removing a common-mode component with the first duty value shown in FIG. 4.

Referring to the equivalent circuit shown in FIG. 2, when the second duty controller 120 is not operated, as shown in FIG. 4, the DC component of the common-mode component $v_{AB\_CM}$ of the voltage between the node A and the node B is ½ (0.5 $v_{link}$) of the DC link voltage.

Figure 5:
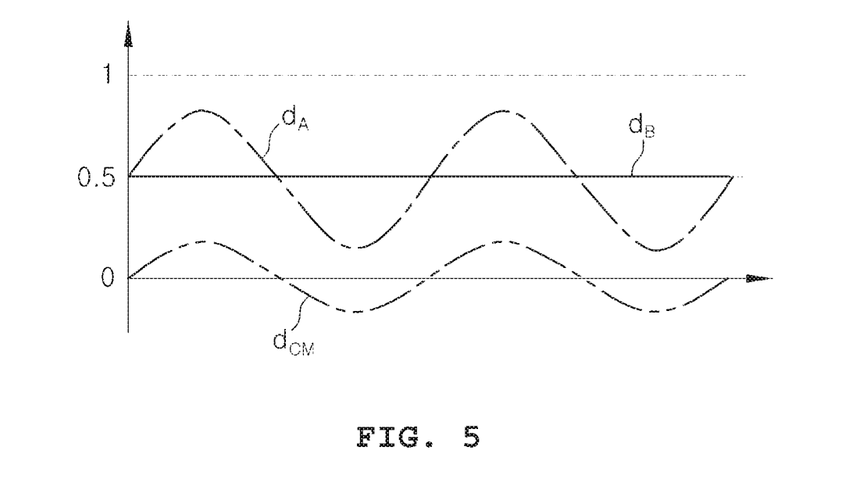

FIG. 5 is a diagram in which the DC-DC converter 15 connected to the rear end of the PFC converter 13 transmits a DC link voltage $v_{link}$ to the energy storage device 17 without a change. When the DC link voltage $v_{link}$ and the voltage of the energy storage device 17 are the same, the second duty value $d_{CM}$ does not have a DC offset, so the DC component of the common-mode component $v_{AB\_CM}$ of the voltage between the node A and the node B can be maintained. Further, the second duty value $d_{CM}$ can be determined to remove only the AC component of the common-mode component $v_{AB\_CM}$ of the voltage between the node A and the node B.

Figure 6:
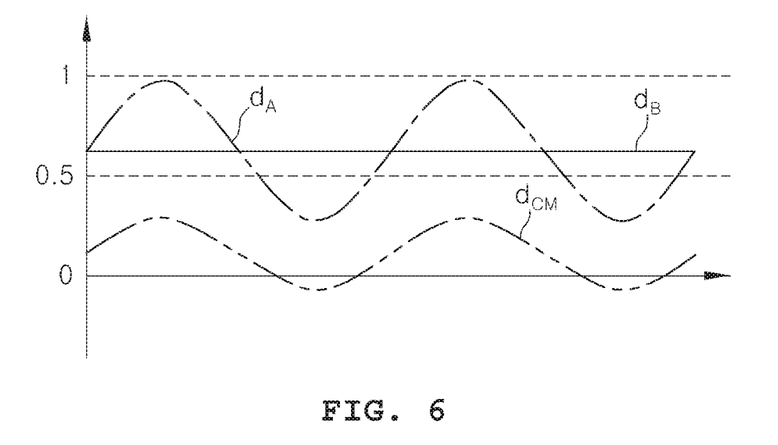

On the other hand, FIG. 6 is a diagram showing the case in which the DC-DC converter 15 connected to the rear end of the PRC converter 13 increases the input DC link voltage $v_{link}$. In this case, the voltage $v_{bat}$ of the energy storage device 17 is larger than the DC link voltage $v_{link}$, so that the second duty value $d_{CM}$ that is created by the second duty controller 120 has to have a DC offset component in reflection of the voltage $v_{bat}$ of the energy storage device 17. When the second duty value $d_{CM}$ having a DC offset component is summed with the first duty values $d_A$ and $d_B$, some of the first duty values may have a saturation area in which it has a value larger than 1.

Figure 7:
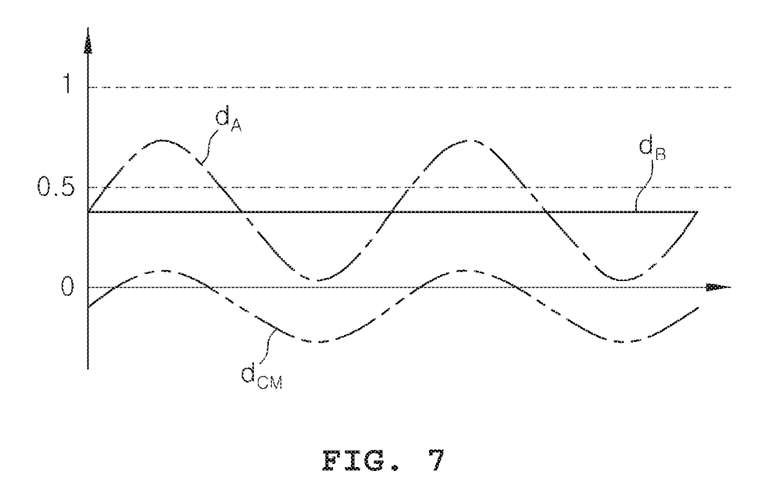

On the other hand, FIG. 7 is a diagram showing the case in which the DC-DC converter 15 connected to the rear end of the PRC converter 13 decreases the input DC link voltage $v_{link}$. In this case, the voltage $v_{bat}$ of the energy storage device 17 is smaller than the DC link voltage $v_{link}$, so that the second duty value $d_{CM}$ that is created by the second duty controller 120 has to have a DC offset component in reflection of the voltage $v_{bat}$ of the energy storage device 17. When the second duty value $d_{CM}$ having a DC offset component is summed with the first duty values $d_A$ and $d_B$, some of the first duty values may have a saturation area in which it has a value larger than 0.

In order to solve this problem, an embodiment of the present disclosure provides the following second control example.

Second Control Example

Even if the magnitudes of the voltages $v_{Y\_Cap\_p}$ and $v_{Y\_Cap\_n}$ of the Y-capacitors $C_{CM1}$ and $C_{CM2}$ are different, the Y-capacitors $C_{CM1}$ and $C_{CM2}$ have substantially infinite impedance for the DC component, so the DC component of the current $i_{CG}$ that flows out to the ground through the Y-capacitors $C_{CM1}$ and $C_{CM2}$ can be ignored.

Accordingly, it is possible to remove low-frequency leakage current due to a common-mode component by controlling only an AC component to be the same as the common-mode component $v_{g\_CM}$ of a grid power source while ignoring the DC component of the component voltage $v_{AB\_CM}$ between the node A and the node B shown in FIG. 2. This removing technique is applied to the second control example of the present disclosure.

To this end, in the second control example of the present disclosure, it is possible to control the switching elements $Q_1$-$Q_4$ of the PFC converter 13 by creating a second duty value $d_{CM}$ for satisfying the following Equation through the second duty controller 120 and summing the second duty value with the first duty value d.

$$v_{Y\text{-}cap\_p} = v_{bat} - \alpha v_{link} \qquad \text{Equation}$$

In this Equation, $v_{Y\text{-}cap\_p}$ is the voltage of the first Y-capacitor $C_{CM1}$ connected to the positive (+) terminal of the output terminal of the DC-DC converter 15, $v_{bat}$ is the voltage of the energy storage device connected to the output terminal of the DC-DC converter 15, and $v_{link}$ is the DC link voltage of the input terminal of the DC-DC converter 15. Further, α, which is an arbitrary constant that is determined between 0 and 1, more specifically a value close to 0.5 or 0.5.

According to the Equation, the magnitude of the voltage of the second Y-capacitor $C_{CM2}$ connected to the negative (−) terminal of the output terminal of the DC-DC converter 15 is always $\alpha v_{link}$.

In FIG. 2, since the DC component of the common-mode component voltage $v_{AB\_CM}$ between the node A and the node B is ½ (0.5 $v_{link}$) of the DC link voltage $v_{link}$ and the magnitude of the voltage the second Y-capacitor $C_{CM2}$ is always $\alpha v_{link}$, the second duty controller 120 can create a second duty value $d_{CM}$ in consideration of only the DC component of '(0.5−α) $v_{link}$' regardless of whether the voltage of the DC-DC converter 15 is increase or decreased. As α comes close to 0.5, it is less required to consider the DC component, and more specifically, only the AC component of the common-mode component voltage $v_{AB\_CM}$ between the node A and the node B can be removed by the second duty value $d_{CM}$ without considering the DC offset when 'α=0.5'.

That is, according to the second control example, duty saturation due to an increase/decrease in voltage of the DC-DC converter 15 does not occur unlike the first control example.

Figure 8:
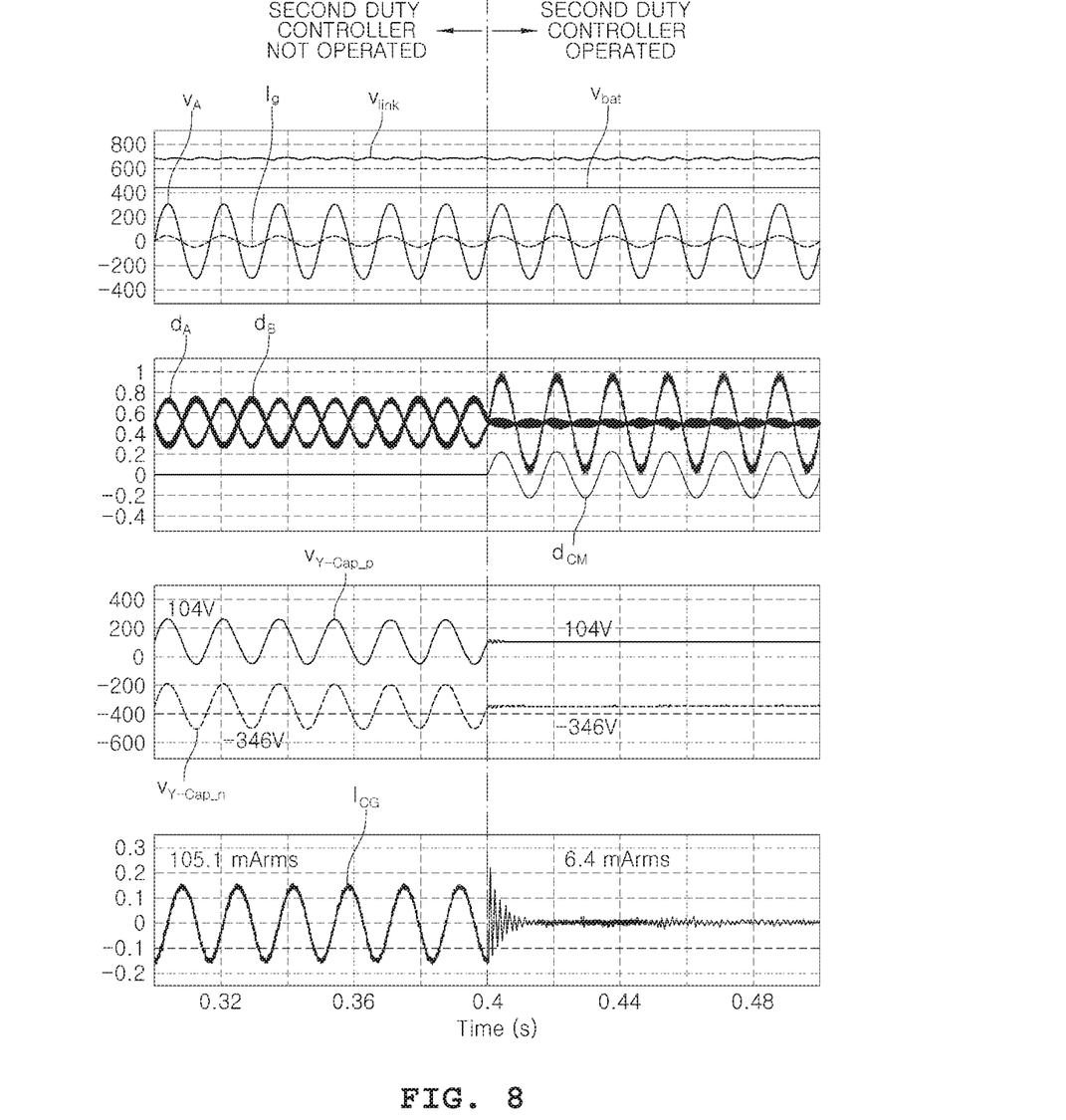
FIG. 8 is a diagram showing various output waveforms by a second control example that controls a PFC converter of a charging apparatus that can reduce low-frequency leakage current according to an embodiment of the present disclosure.

FIG. 8 is a diagram showing various output waveforms by a second control example that controls a PFC converter of a charging apparatus that can reduce low-frequency leakage current according to an embodiment of the present disclosure.

The uppermost waveform diagram in FIG. 8 shows an input AC voltage $v_g$, an input AC $i_g$, an AC link voltage $v_{link}$ of the output terminal of the PFC converter 13, and the voltage of an energy storage device (i.e., the output voltage $v_{bat}$ of the DC-Dc converter 15 or the charging apparatus) before and after the second control example is performed. It can be seen from the waveform diagram that even though the second duty controller 120 is operated, a second duty value $d_{CM}$ for making the magnitudes of the voltages $v_{Y\_Cap\_p}$ and $v_{Y\_Cap\_n}$ of the Y-capacitors capacitors $C_{CM1}$ and $C_{CM2}$ into ½ of the voltage $v_{bat}$ of the energy storage device 17 is summed, and the PFC converter 13 is controlled, the DC link voltage $v_{link}$ and the voltage $v_{bat}$ of the energy storage device are less changed.

The second waveform diagram from the upper end in FIG. 8 shows duty values, in which $d_A$ that is determined by the first duty controller 110 shows the duty value of the first switching element $Q_1$ of the first leg, $d_B$ that is determined by the first duty controller 110 shows the duty value of the third switching element $Q_3$ of the second leg, and $d_{CM}$ shows a second duty value created by the second duty controller 120. As shown in FIG. 8, when the second duty value $d_{CM}$ for satisfying the Equation 2 is created by the second duty controller 120, the second duty value $d_{CM}$ is summed with $d_A$ and $d_B$ that are determined by the first duty controller 110, so the magnitudes of $d_A$ and $d_B$ are changed. The changed duty value is the final duty value $d_{new}$.

The third waveform diagram from the top in FIG. 8 shows the voltages $v_{Y\_Cap\_p}$ and $v_{Y\_Cap\_n}$ of the Y-capacitors $C_{CM1}$ and $C_{CM2}$, in which it can be seen that a component having substantially the same frequency as an input AC voltage is included in the voltages $v_{Y\_Cap\_p}$ and $v_{Y\_Cap\_n}$ of the Y-capacitors $C_{CM1}$ and $C_{CM2}$ before the second duty controller 120 is operated, but after the second duty controller 120 is operated, the AC components are removed from the voltages $v_{Y\_Cap\_p}$ and $v_{Y\_Cap\_n}$ of the Y-capacitors $C_{CM1}$ and $C_{CM2}$ and DC voltages are output.

The lowermost waveform diagram in FIG. 8 shows a current $i_{CG}$ that flows out to the ground from the node between two Y-capacitors $C_{CM1}$ and $C_{CM2}$, in which it can be seen that a large-amplitude leakage current having substantially the same frequency as an input AC flows out to the ground before the second duty controller 120 is operated, but after the second duty controller 120 is operated, the current $i_{CG}$ is almost close to 0.

The charging apparatus that can reduce low-frequency leakage current according to various embodiments of the present disclosure, as described above, can reduce low-frequency leakage current due to the common-mode component of an asymmetric DC power source. Accordingly, the charging apparatus that can reduce low-frequency leakage current according to various embodiments of the present disclosure can prevent stoppage of charging by reducing leakage current under the detection level (about 30 mArms) of an RCD device in a charging facility.

In particular, the charging apparatus that can reduce low-frequency leakage current according to various embodiments of the present disclosure can prevent saturation of a duty value for control and can remove low-frequency leakage current due to the common-mode component within a large voltage range by creating a common-mode removal duty value such that the magnitude of the voltage of a Y-capacitor becomes the difference of values obtained by scaling the voltage of the energy storage device and the link voltage at a predetermined ratio.

Although the present disclosure was described above with reference to specific embodiments, it would be apparent to those skilled in the art that the present disclosure may be changed and modified in various ways within the claims.

What is claimed is:

1. A charging apparatus capable of reducing low-frequency leakage current, the charging apparatus comprising:
   a power factor correction converter including a switch, wherein the power factor correction converter converts an AC power inputted by an on/off control of the switch into a DC power by correcting a power factor of the AC power;
   a DC-DC converter changing a magnitude of voltage outputted from the power factor correction converter into a magnitude of voltage required by an energy storage device to be charged;
   a first duty controller determining a first duty value of the switch for outputting a voltage having a predetermined magnitude through the power factor correction converter based on a magnitude of a differential mode component of the AC power; and a second duty controller determining a second duty value of the switch for removing a common-mode component of the AC power based on the common-mode component, wherein the on/off control of the switch is performed based on a final duty value obtained by summing the first duty value and the second duty value.

2. The charging apparatus of claim 1, further comprising first and second Y-capacitors respectively connected to a positive (+) terminal and a negative (−) terminal of an output terminal of the DC-DC converter.

3. The charging apparatus of claim 2, wherein the second duty controller determines the second duty value based on a relationship between a voltage of the first Y-capacitor or the second Y-capacitor and a voltage of the energy storage device.

4. The charging apparatus of claim 3, wherein the second duty controller determines the second duty value such that each of the voltages of the first Y-capacitor and the second Y-capacitor becomes half (½) of the voltage of the energy storage device.

5. The charging apparatus of claim 3, wherein the second duty controller determines the second duty value using the following equation:

$$v_{Y\text{-}cap\_p} = v_{bat} - \alpha v_{link},$$

wherein $v_{Y\text{-}cap\_p}$ is the voltage of the first Y-capacitor connected to the positive (+) terminal of the output terminal of the DC-DC converter, $v_{bat}$ is the voltage of the energy storage device connected to the output terminal of the DC-DC converter, $v_{link}$ is a DC link voltage of an input terminal of the DC-DC converter, and $\alpha$ is an arbitrary constant that is determined between 0 and 1.

6. The charging apparatus of claim 5, wherein the arbitrary constant $\alpha$ is a value that is close to 0.5.

7. The charging apparatus of claim 5, wherein the arbitrary constant $\alpha$ is 0.5.

8. The charging apparatus of claim 1, wherein the DC-DC converter is a non-insulated DC-DC converter.

9. The charging apparatus of claim 1, wherein the power factor correction converter includes:

a first leg including a first switch and a second switch that are directly connected to each other; and a second leg including a third switch and a fourth switch that are directly connected to each other, wherein the first leg and the second leg are connected to each other in parallel between input terminals of the DC-DC converter, a first end of an AC power source providing the AC power is connected to a connection node of the first switch and the second switch, and a second end of the AC power source is connected to a connection node of the third switch and the fourth switch.

10. The charging apparatus of claim 9, wherein the first duty value includes a duty value of the first switch and a duty value of the third switch, the duty value of the first switch and the duty value of the third switch have a sine waveform increasing or decreasing in increments or decrements, respectively, of 0.5 as a time elapses, and the duty value of the first switch and the duty value of the third switch have a mutual compensation relationship in increments or decrements of 0.5.

11. A charging apparatus capable of reducing low-frequency leakage current, the charging apparatus comprising:

a power factor correction converter including a switch and converting an AC power inputted by an on/off control of the switch into a DC power by correcting a power factor of the AC power;

a DC-DC converter changing a magnitude of voltage outputted from the power factor correction converter into a magnitude of voltage required by an energy storage device to be charged;

first and second Y-capacitors connected respectively between a ground and positive (+) and negative (−) terminals of an output terminal of the DC-DC converter;

a first duty controller determining a first duty value of the switch for outputting a voltage having a predetermined magnitude through the power factor correction converter based on a magnitude of a differential mode component of the AC power; and a second duty controller determining a second duty value of the switch for a voltage of the first or second Y-capacitor into a DC voltage, wherein the on/off control of the switch is performed based on a final duty value obtained by summing the first duty value and the second duty value.

12. The charging apparatus of claim 11, wherein the power factor correction converter includes:

a first leg including a first switch and a second switch that are directly connected to each other; and a second leg including a third switch and a fourth switch that are directly connected to each other, and the first leg and the second leg are connected to each other in parallel between two input terminals of the DC-DC converter, a first end of an AC power source providing the AC power is connected to a connection node of the first switch and the second switch, and a second end of the AC power source is connected to a connection node of the third switch and the fourth switch.

13. The charging apparatus of claim 12, wherein the second duty controller determines the second duty value of the switch to remove a common-mode component of the AC power source between a connection node of the first switch and the second switch and a connection node of the third switch and the fourth switch.

14. The charging apparatus of claim 11, wherein the second duty controller determines the second duty value based on a relationship between the voltage of the first Y-capacitor or the second Y-capacitor and the voltage of the energy storage device.

15. The charging apparatus of claim 14, wherein the second duty controller determines the second duty value such that the voltages of the first Y-capacitor and the second Y-capacitor becomes half (½) of the voltage of the energy storage device.

16. The charging apparatus of claim 14, wherein the second duty controller determines the second duty value based on the following equation:

$$v_{Y\text{-}cap\_p} = v_{bat} - \alpha v_{link},$$

wherein $v_{Y\text{-}cap\_p}$ is the voltage of the first Y-capacitor connected to the positive (+) terminal of the output terminal of the DC-DC converter, $v_{bat}$ is the voltage of the energy storage device connected to the output terminal of the DC-DC converter, $v_{link}$ is a DC link voltage of an input terminal of the DC-DC converter, and $\alpha$ is an arbitrary constant that is determined between 0 and 1.

17. The charging apparatus of claim 16, wherein the arbitrary constant $\alpha$ is a value that is close to 0.5.

18. The charging apparatus of claim 16, wherein the arbitrary constant $\alpha$ is 0.5.

19. The charging apparatus of claim 11, wherein the DC-DC converter is a non-insulated converter.

\* \* \* \* \*